United States Patent
Compton et al.

(10) Patent No.: US 9,915,383 B2
(45) Date of Patent: Mar. 13, 2018

(54) WELDED CONNECTIONS OF LINED PIPE

(71) Applicant: United Pipeline Systems, Inc., Chesterfield, MO (US)

(72) Inventors: Ted Compton, Durango, CO (US); Douglass Fairfax Wilson, Durango, CO (US); Brennan Metcalf, Hesperus, CO (US)

(73) Assignee: United Pipeline Systems, Inc., Durango, CO (US)

( * ) Notice: Subject to any disclaimer, the term of this patent is extended or adjusted under 35 U.S.C. 154(b) by 979 days.

(21) Appl. No.: 14/107,882

(22) Filed: Dec. 16, 2013

(65) Prior Publication Data

US 2014/0103638 A1    Apr. 17, 2014

Related U.S. Application Data (63) Continuation of application No. PCT/US2012/043345, filed on Jun. 20, 2012.

(60) Provisional application No. 61/499,387, filed on Jun. 21, 2011.

(51) Int. Cl.
*F16L 13/02* (2006.01)
*F16L 58/18* (2006.01)
*F16L 47/02* (2006.01)

(52) U.S. Cl.
CPC ........... *F16L 13/02* (2013.01); *F16L 13/0263* (2013.01); *F16L 47/02* (2013.01); *F16L 58/181* (2013.01)

(58) Field of Classification Search
CPC .............................. F16L 47/03; B29C 65/22
USPC .................................................. 285/21.2, 55
See application file for complete search history.

(56) References Cited

U.S. PATENT DOCUMENTS

| | | | | |
|---|---|---|---|---|
| 2,962,305 A | * | 11/1960 | McCarthy | ............... B29C 65/28 |
| 3,508,766 A | * | 4/1970 | Berg | ................... F16L 13/0263 |
| 3,943,334 A | * | 3/1976 | Sturm | ..................... F16L 47/03 |
| 4,047,739 A | * | 9/1977 | Aitken | ............... B29C 65/0609 |
| | | | | 285/111 |
| 4,366,971 A | * | 1/1983 | Lula | ..................... F16L 58/182 |

(Continued)

FOREIGN PATENT DOCUMENTS

| | | | | |
|---|---|---|---|---|
| CA | 2321764 A1 | * | 9/1999 | ......... B29C 66/1122 |
| CA | 2295402 A1 | * | 7/2000 | ........... B29C 65/342 |

(Continued)

OTHER PUBLICATIONS

European Search Report, Application No. 12802402.3-1758, dated Jan. 30, 2015, 6 pages.

(Continued)

*Primary Examiner* — David E Bochna
(74) *Attorney, Agent, or Firm* — Senniger Powers LLP (57) ABSTRACT

A connection of two pipes each including a liner. Liner sections connected to the liners are sections joined together forming a joint of the liner sections. An electrofusion coupling may overlie the joint of the liner sections and be used to fuse the joint. A collar may be positioned to overlie the joint of the liner sections. A bushing may be positioned between the joint of the liner sections and the collar. Hubs may be connected to the ends of the pipes. The liner sections and hubs may include corresponding structure which resists movement of the liner sections away from the joint of the liner sections. A connection of two pipes each including a liner may be formed according to disclosed methods.

17 Claims, 11 Drawing Sheets

(56) References Cited

U.S. PATENT DOCUMENTS

| | | | |
|---|---|---|---|
| 4,691,740 A * | 9/1987 | Svetlik | B29C 49/26 |
| 4,718,698 A * | 1/1988 | Hill | B29C 65/342 |
| 4,927,184 A * | 5/1990 | Bourjot | F16L 47/03 |
| 5,104,152 A * | 4/1992 | Galfant | F16L 58/181 |
| 5,127,116 A * | 7/1992 | Greig | B29C 63/346 |
| | | | 285/21.2 |
| 5,150,922 A * | 9/1992 | Nakashiba | F16L 47/03 |
| 5,224,738 A * | 7/1993 | Taga | F16L 47/02 |
| 5,282,652 A * | 2/1994 | Werner | F16L 58/182 |
| 5,364,130 A | 11/1994 | Thalmann | |
| 5,566,984 A * | 10/1996 | Abbema | F16L 13/0263 |
| 5,618,065 A * | 4/1997 | Akiyama | B29C 45/1671 |
| | | | 285/21.2 |
| 5,634,672 A | 6/1997 | Stack et al. | |
| 5,685,572 A * | 11/1997 | Linton | F16L 47/03 |
| 5,692,785 A | 12/1997 | Wartluft et al. | |
| 5,730,472 A | 3/1998 | Krause et al. | |
| 5,824,179 A * | 10/1998 | Greig | F16L 47/03 |
| 5,988,691 A * | 11/1999 | Cruickshank | F16L 13/0263 |
| 6,036,235 A * | 3/2000 | Anderson | F16L 15/006 |
| 6,059,319 A | 5/2000 | Wyke | |
| 6,375,226 B1 * | 4/2002 | Dickinson | B29C 65/342 |
| 6,406,063 B1 * | 6/2002 | Pfeiffer | F16L 47/03 |
| 6,478,338 B1 * | 11/2002 | Dalmolen | F16L 47/03 |
| 6,680,464 B1 | 1/2004 | Carter, Jr. et al. | |
| 6,979,025 B2 | 12/2005 | Conder et al. | |
| 7,431,341 B2 * | 10/2008 | McIntyre | F16L 13/0263 |
| 8,256,089 B2 * | 9/2012 | Pionetti | F16L 58/1009 |
| 9,022,429 B2 * | 5/2015 | Heindl | F16L 47/03 |
| 2004/0070199 A1 | 5/2004 | Trivelli | |
| 2005/0173919 A1 * | 8/2005 | Posson | F16L 15/08 |
| 2007/0284872 A1 * | 12/2007 | Pionetti | F16L 1/19 |
| 2011/0193339 A1 * | 8/2011 | Kenworthy | F16L 47/03 |
| 2015/0027581 A1 * | 1/2015 | Bouey | F16L 47/03 |
| 2015/0076809 A1 * | 3/2015 | Barnes | F16L 47/03 |

FOREIGN PATENT DOCUMENTS

| | | | | |
|---|---|---|---|---|
| WO | WO 2012017171 A1 * | 2/2012 | | F16L 1/15 |
| WO | WO 2012115571 A1 * | 8/2012 | | F16L 39/005 |

OTHER PUBLICATIONS

Office Action, Gulf Cooperation Council Application No. 2012-21583, dated Nov. 16, 2014, 4 pages.
APTECUSA Pipeline Solution Specialists Brochure, admitted prior art, 4 pages.
International Search Report in related Application PCT/US2012/43345 dated Nov. 29, 2012, 4 pages.
Written Opinion in related Application PCT/US2012/43345 dated Nov. 29, 2012, 7 pages.

* cited by examiner

WELDED CONNECTIONS OF LINED PIPE

CROSS-REFERENCE TO RELATED APPLICATIONS

This application is a continuation of PCT Patent Application No. PCT/US2012/043345, filed Jun. 20, 2012, which claims priority to U.S. Provisional Patent Application No. 61/499,387, filed Jun. 21, 2011, each of which is hereby incorporated by reference in their entirety.

FIELD OF THE INVENTION

The present disclosure generally relates to pipe connections. In particular, the present disclosure relates to connections of lined pipe and associated methods.

BACKGROUND OF THE INVENTION

This invention relates to connections and methods for connecting lined pipe. A variety of circumstances exist in which it is desirable to line a pipeline. For example, pipelines such as those used in the mining, chemical, and oil and gas industries may carry fluids at high pressure and which subject the pipeline to abrasion and corrosion. A liner may be provided inside the pipeline to protect the pipeline or to rehabilitate the pipeline. It is desirable to provide improved connections and methods for forming connections of lined pipes.

SUMMARY

In one aspect, the present invention is directed to a connection of two pipes each including a liner. The connection includes liner sections connected to the liners. The liner sections are tubular and are formed of fusible material. The liner sections are fused together forming a fused joint of the liner sections. Fusible material extends between the liner sections at the fused joint. An electrofusion coupling overlies the fused joint of the liner sections. The connection also includes a collar assembly overlying the electrofusion coupling. The collar assembly is positioned so that an inner surface of the collar assembly radially opposes the electrofusion coupling and provides radial backing to the electrofusion coupling for radially reinforcing the electrofusion coupling.

In another aspect, the present invention is directed to a connection of two pipes each including a liner. The connection includes hubs joined to the pipes and operatively connected to each other. Liner sections extend inside the hubs and operatively connected to each other by joint structure to form a flow path from one liner section to the other. The liner sections include external structure, and the hubs including internal structure. The external structure of the liner sections engage the internal structure of the hubs to resist movement of the liner sections away from each other.

In another aspect, the present invention is directed to a method of forming a connection of two pipes each including a liner. The method includes connecting liner sections to the ends of the liners and positioning an electrofusion coupling over one of the liner sections. A tubular collar assembly is positioned over an end of one of the liner sections. Ends of the liner sections are positioned in register with each other to form a joint of the liner sections. The electrofusion coupling is moved over the joint of the liner sections and the joint of the liner sections is fused using the electrofusion coupling. The collar assembly is moved over the electrofusion coupling to provide the electrofusion coupling with radial backing.

In yet another aspect, the present invention is directed to a kit for joining pipes together where the pipes each have a liner to form a joint of the pipes that is continuously lined through the joint. The kit includes a collar assembly including a tubular member adapted for being rigidly connected to ends of both of the pipes. The kit also includes a bushing having a tubular shape, an exterior surface configured for conforming engagement with an interior surface of the tubular member, and an interior surface having a circumferentially extending recess sized and shaped for conformally receiving an electrofusion coupling for transmitting radial forces from the electrofusion coupling to the bushing.

BRIEF DESCRIPTION OF THE DRAWINGS

Corresponding reference characters indicate corresponding parts throughout the drawings.

DETAILED DESCRIPTION

Liners of various types of suitable material may be used for protecting a pipeline and/or rehabilitating a pipeline. The liner provides a new internal surface or flow path for the pipeline. For example, in a diameter reduction lining operation, a liner having an outside diameter larger than the inside diameter of the pipeline to be lined is temporarily reduced in diameter for insertion into the pipeline. The liner expands to a tight fit following insertion into the pipeline.

Connections and methods of the present invention may be used for connecting lined pipes, such as pipes lined with liners installed using the diameter reduction method. Lined pipe connections according to the present invention may include pipes lined with various liner materials, such as high density polyethylene (HDPE), polyethylene (PE), cross linked polyethylene, polypropylene (PP), polyamide (PA), nylon, polyetheretherketone (PEEK). As will become apparent, it is desirable to use a heat fusible material. In general, any heat fusible thermoplastic material such as those named above may be used without departing from the scope of the present invention. Moreover, methods other than diameter reduction may be used to install the liners. For example, any pull-in method, such as slip-fit installation, may be used without departing from the scope of the present invention.

Referring now to the drawings, FIGS. 1-11 illustrate connections between adjacent lined pipes of the present invention. The figures do not show the sections of lined pipe to be connected. Only structure for forming example connections is shown. The structure is also referred to as a kit herein. It is understood the sections of lined pipe would generally each include a pipe section (e.g., steel pipe) and a length of liner (e.g., a heat fusible thermoplastic liner) installed in the pipe section.

Figure 1:
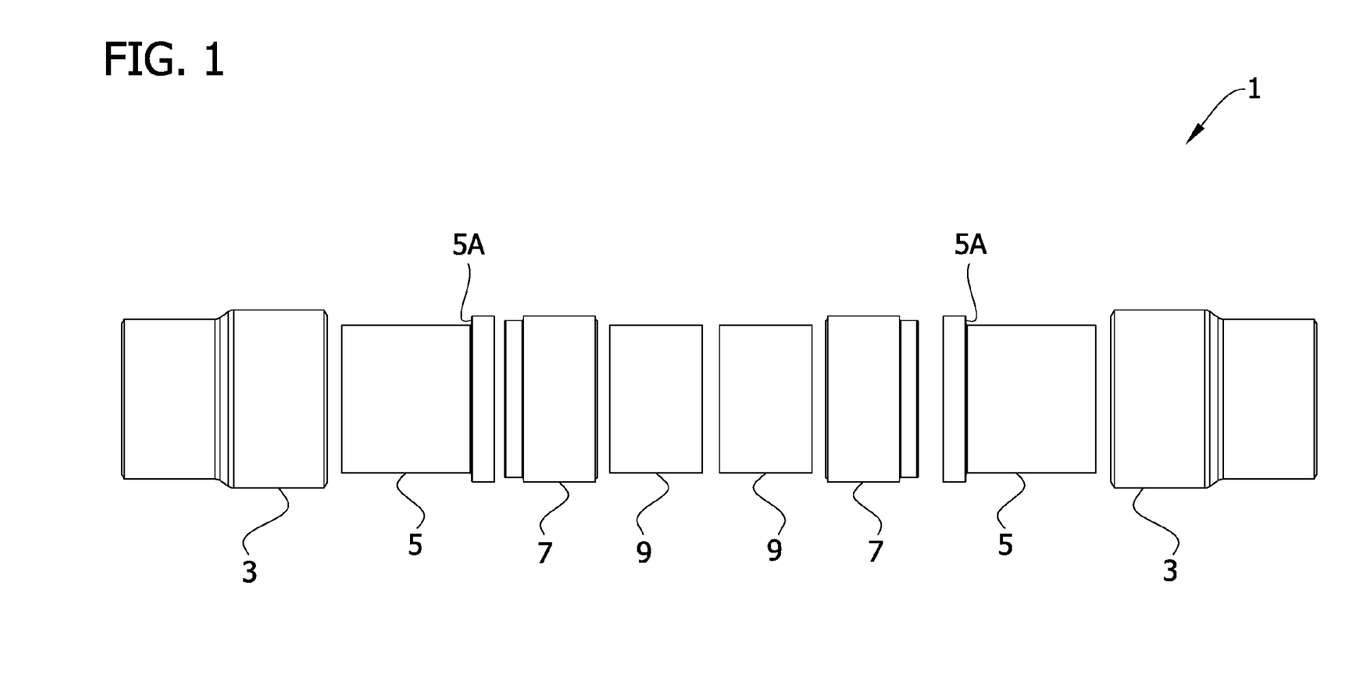
FIG. 1 is an exploded side elevation of a lined pipe connection kit of one embodiment of the present invention.
Figure 2:
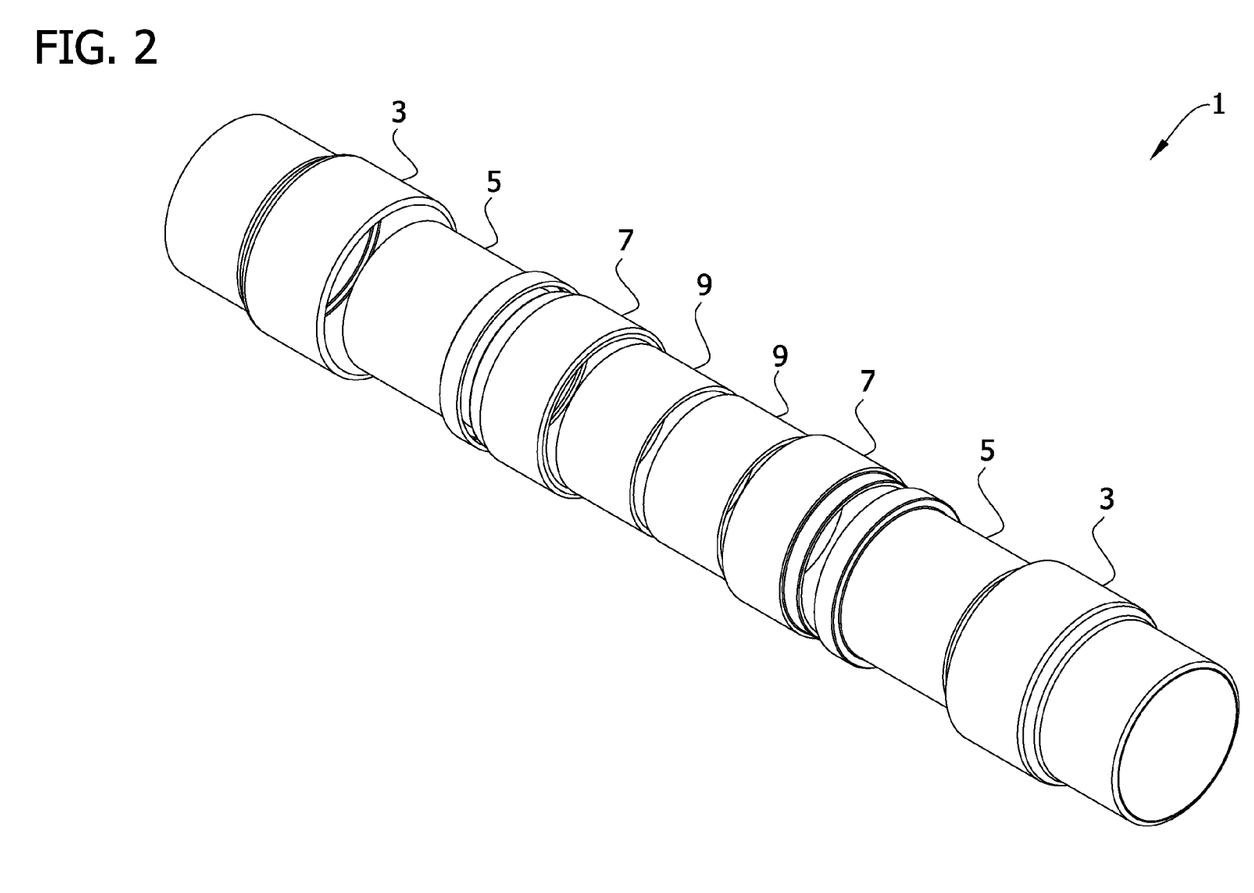
FIG. 2 is the exploded lined pipe connection kit of FIG. 1 but shown in perspective.
Figure 3:
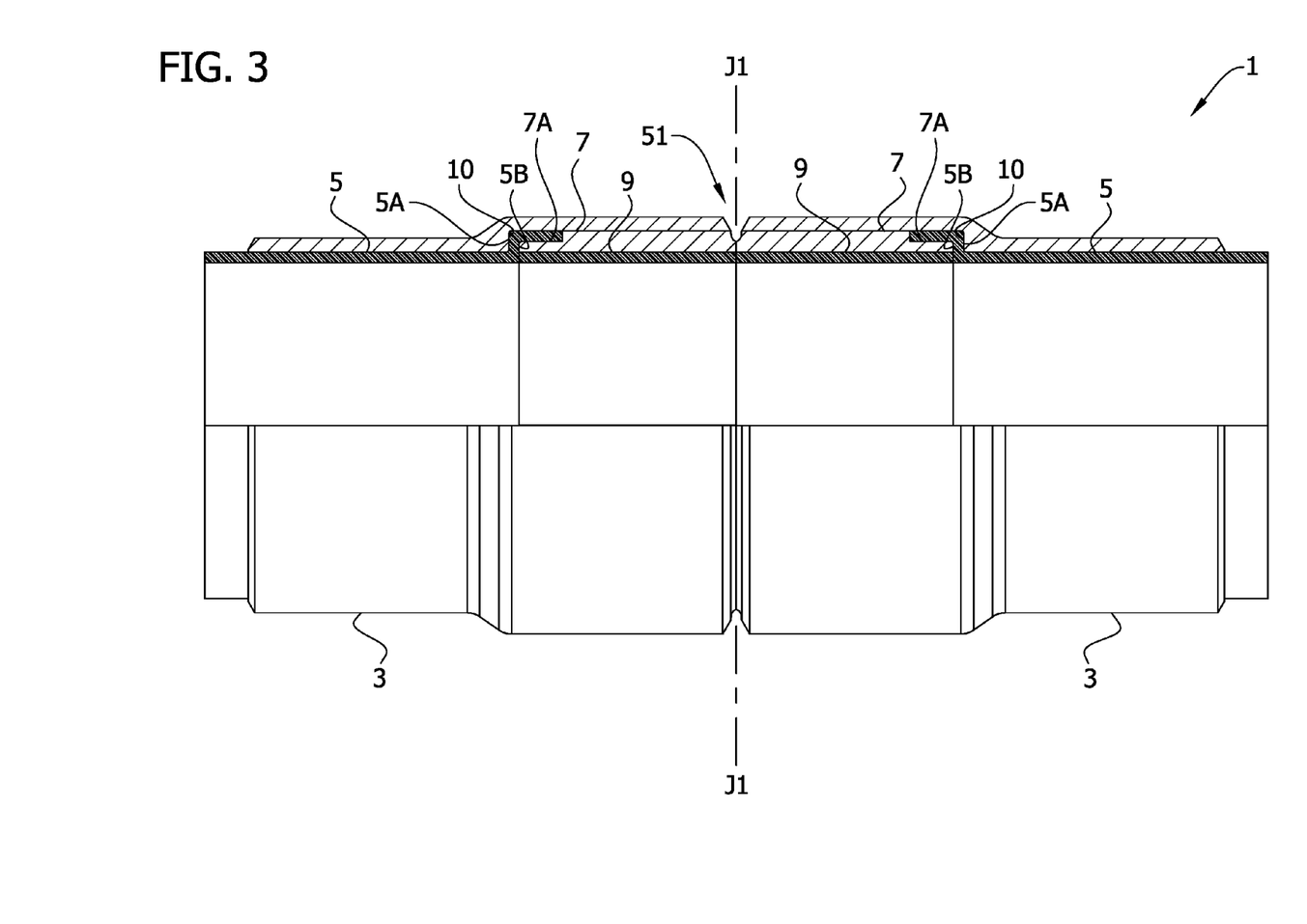
FIG. 3 is the assembled lined pipe connection kit having a quarter section removed.
Figure 4:
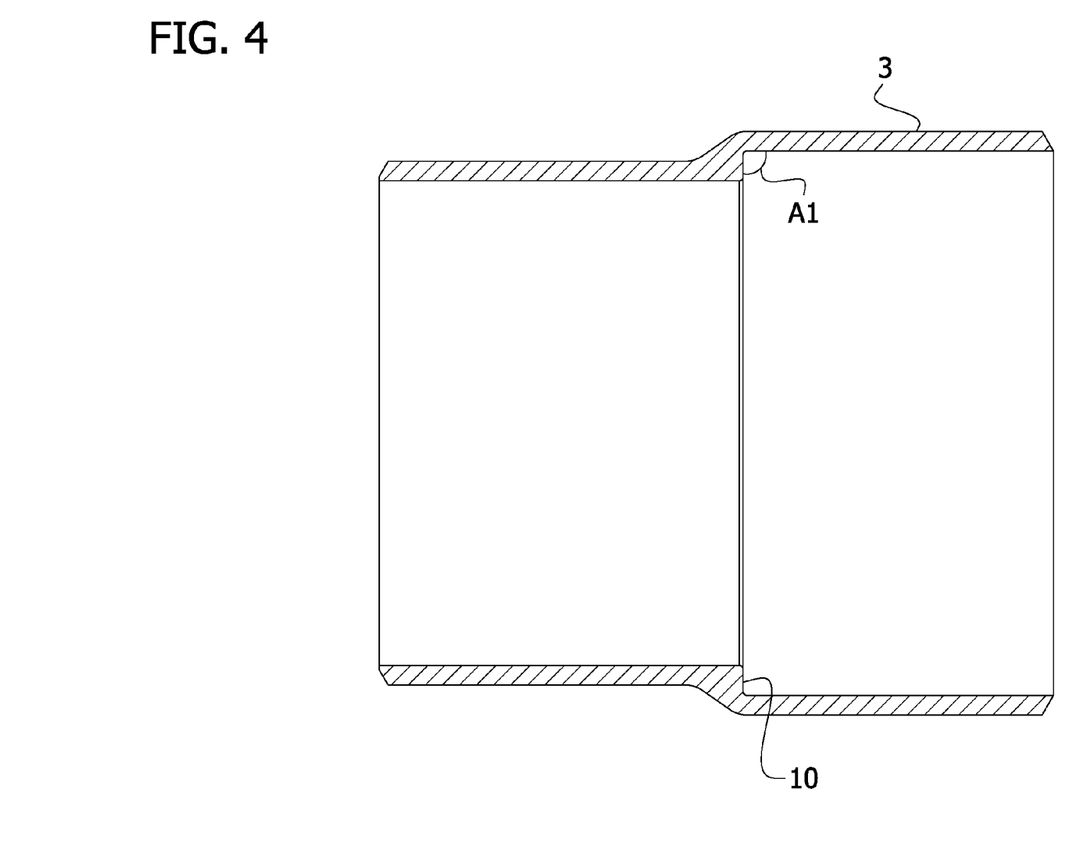
FIG. 4 is a section of a hub of the lined pipe connection.

Referring in particular to FIGS. 1-3, the connection of the first embodiment is designated generally by the reference number 1. The connection includes two sides which each have four parts. More specifically, each side of the connection includes a hub 3, a stubend 5, a filler member or bushing 7, and a liner segment 9. A proximal end of each hub 3 is joined (e.g., welded) to a respective end of a pipe to be connected. The hubs 3 are tubular and include internal structure for positioning the stubends 5 with respect to the hubs. As shown in FIG. 4, in the illustrated embodiment, the internal structure is an internal circumferential shoulder 10 between an enlarged distal end of the hub and the smaller proximal end. As described in further detail below, the shoulders 10 (broadly "internal structure") engage the stubends 5 for limiting movement of the stubends away from a joint line J1 of the stubends 5 (FIG. 3) between the sides of the connection 1. As shown in FIG. 4, in the illustrated embodiment, the shoulder 10 is generally perpendicular, or oriented at an angle A1 of about 90 degrees, with respect to the internal surface of the hub 3. The angle A1 may have other values (e.g., less than about 70, 80, 90, 100 or more degrees, or at least about 70, 80, 90, or more degrees) without departing from the scope of the present invention. The shoulders 10 of the hubs 3 face away from the pipes to which the hubs are connected. In other words, the hubs are oriented so the shoulders face the joint of the stubends 5, or the joint line J1. The hubs 3 may be formed of various suitable materials, such as steel. Hubs having configurations other than illustrated may be used without departing from the scope of the present invention.

The stubends 5 may be referred to broadly as "liner sections." The stubends 5 may be formed of the same material as the liners, such as a heat fusible thermoplastic material. The stubends 5 may be part of the liners, or may be formed separately from the liners and thereafter connected to the liners. In the illustrated embodiment, the stubends 5 are formed separately from the liners. After the hubs 3 are connected to the pipes, the stubends 5 are connected to ends of the liners of the respective pipes. Each stubend 5 is tubular and includes external structure at the juncture between an enlarged distal end of the stubend and a smaller proximal end for locating the stubend with respect to a hub 3. In the illustrated embodiment, the external structure is a flange 5A (broadly "external structure") corresponding to the internal shoulder 10 of the hub. The stubend also includes an internal flange or step 5B on the inner surface of the stubend for locating other components of the connection with respect to the stubend. To connect a stubend 5 to a liner, an end of the liner is stretched from inside the pipe or hub 3 to a position outside the hub where the end of the liner is accessible. An end of the stubend 5 is then fused to the end of the liner. After fusing the stubend 5 to the liner, the end of the liner is permitted to retract back into the pipe. Desirably, the end of the liner retracts back into the pipe until the external flange 5A of the stubend 5 engages the internal shoulder 10 of the hub 3. The external flange 5A of each stubend 5 faces the shoulder 10 of a respective hub 3. The shoulders 10 of the hubs 3 act as "stops" for positioning the stubends 5 with respect to the hubs. This process of connecting the stubend 5 to the liner is carried out on both sides of the connection 1. Stubends having configurations other than illustrated may be used without departing from the scope of the present invention. For example, the stubends 5 may not include an external flange 5A or other structure that engages internal structure of the hubs 3. Moreover, the stubends 5 may be omitted without departing from the scope of the present invention. For example, the ends of the liners themselves ("liner sections") may be used to form the connection of the liners as described herein with respect to the stubends 5.

After connecting the stubends 5 to the liners, the filler members 7 are positioned inside the stubends. Each filler member 7 is tubular and includes an external flange or step 7A on its outer surface. The filler members 7 are pressed into respective stubends 5 into a position in which ends of the filler members engage the internal flanges 5A of the stubends 5, and wedge the stubends outward in sealing relation with the hubs 3. The ends of the filler members 7 opposite the flanges 5A are about flush with the free end of the hubs 3. The filler members 7 may be made of various suitable materials. For example, the filler member may be made of an Inconel® alloy, sold by Special Metals Corporation of Huntington, W. Va. The filler members 7 are desirably made of material that is non-corrosive. Filler members 7 having other configurations may be used without departing from the scope of the present invention. Moreover, the filler members 7 may be omitted without departing from the scope of the present invention.

After the filler members 7 are installed, the liner segments 9 are inserted into the filler members. The liner segments 9 are tubular and have an inner diameter generally the same as the smaller inner diameter of the stubends 5 and the liners in the pipes to be connected. The liner segments 9 are moved into respective filler members 7 to a position in which the ends of the liner segments engage the internal flanges 5A of the stubends 5 and the opposite ends of the liner segments 9 are about flush with the corresponding ends of the filler members 7 adjacent the joint line J1. The liner segments 9 may be made of the same material as the liners in the pipes to be connected. For example, the liner segments may be formed of a heat fusible thermoplastic material. The engagement of the liner segments may be considered joint structure in this embodiment. In one embodiment, the liner segments 9 are not joined to each other or to the stubends 5. The liner segments 9 may have other configurations, and the liner segments 9 may be omitted, without departing from the scope of the present invention. For example, if the liner segments 9 are omitted, the stubends 5 may be suitably modified to perform the functions of the liner segments 9 (e.g., form the joint at joint line J1).

After inserting the liner segments 9, the hubs 3 and liner segments 9 are ready for welding to form a seal. The connection 1 is welded at a gap 51 between the free ends of the hubs 3 at the joint line J1. Desirably, the filler members 7 are made of a material that protects the liner segments 9 from heat generated during welding.

The completed connection 1 provides a leak-proof, inert fluid path. The inside diameters of the stubends 5 and the liner segments 9 provide the connection 1 with a generally constant inside diameter which corresponds to the inside diameter of the liners connected. Thus, the diameter of the flow path from liner to liner across the connection 1 is generally constant. In embodiments in which the stubends 5 and liner segments 9 are made of thermoplastic material, the connection provides uninterrupted thermoplastic material along substantially the entire length of the connection 1. In other words, thermoplastic material is provided along substantially the entire distance between the connected ends of the liners. This construction is beneficial because it provides a flow path along the connection 1 that is bounded substantially continuously by abrasion-resistant thermoplastic material. The construction of the connection 1 provides enhanced axial and radial strength at the connection. Moreover, the connection 1, and in particular the weld at the weld gap 51, is isolated from tension forces on the liners because of the engagement of the external flanges 5A on the stubends 5 with the internal shoulders 10 on the hubs 3. Stated another way, the engagement of the external flanges 5A on the stubends 5 with the internal shoulders 10 on the hubs 3 provides isolation and strain relief for the joint. Any tension forces in the pipe liners and stubends 5 tending to pull apart the opposing stubends in the connection 1 are transferred via the flanges 5A and 10 from the stubends to the hubs 3 and thence to the pipes. Tension forces are not transferred to the adjacent liner segments 9 or to the filler members 7 thereby protecting the integrity of the joint.

Figure 5:
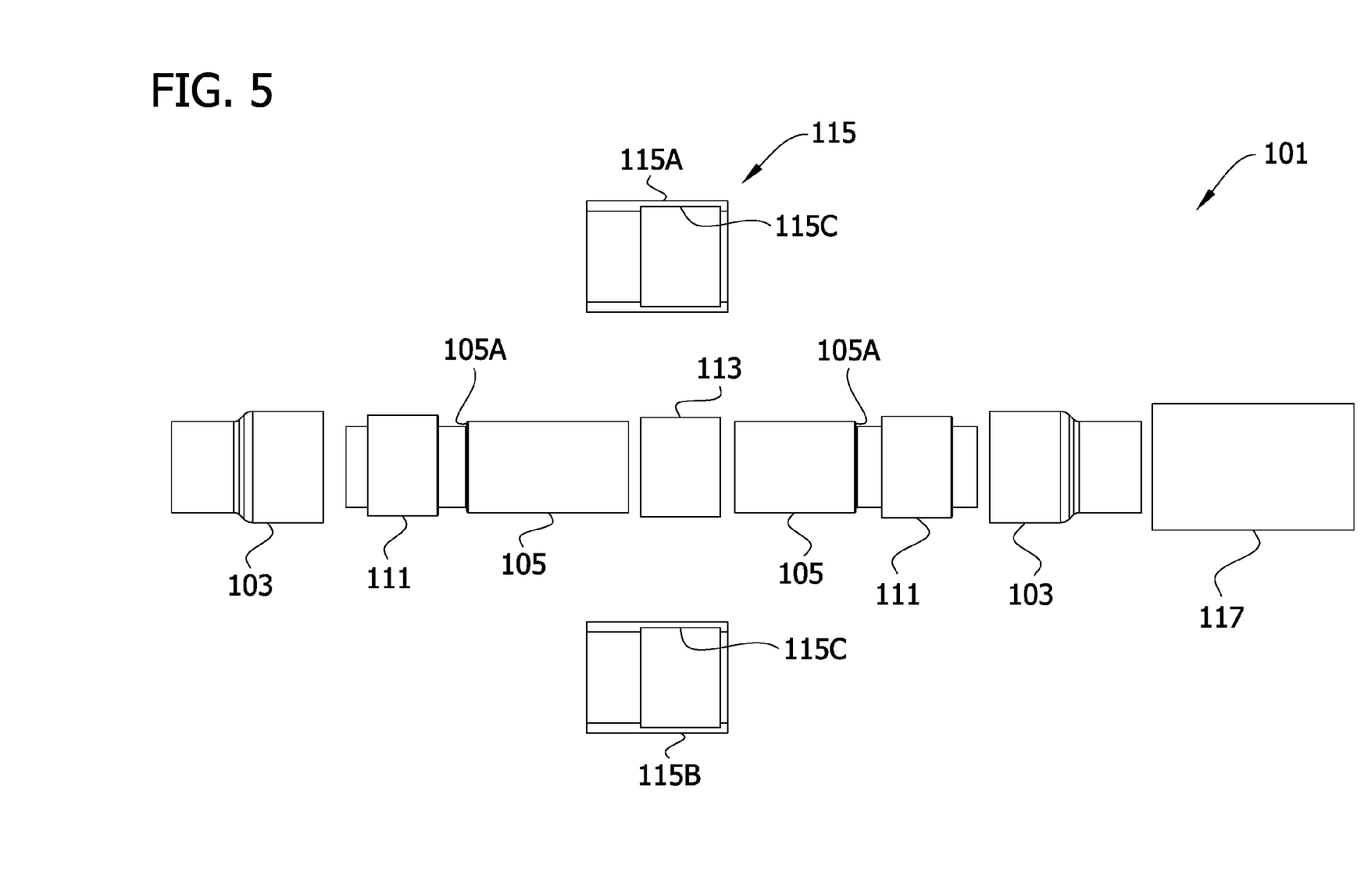
FIG. 5 is an exploded side elevation of a second embodiment of a lined pipe connection kit showing clamshell bushing parts turned toward the viewer to show internal construction.
Figure 6:
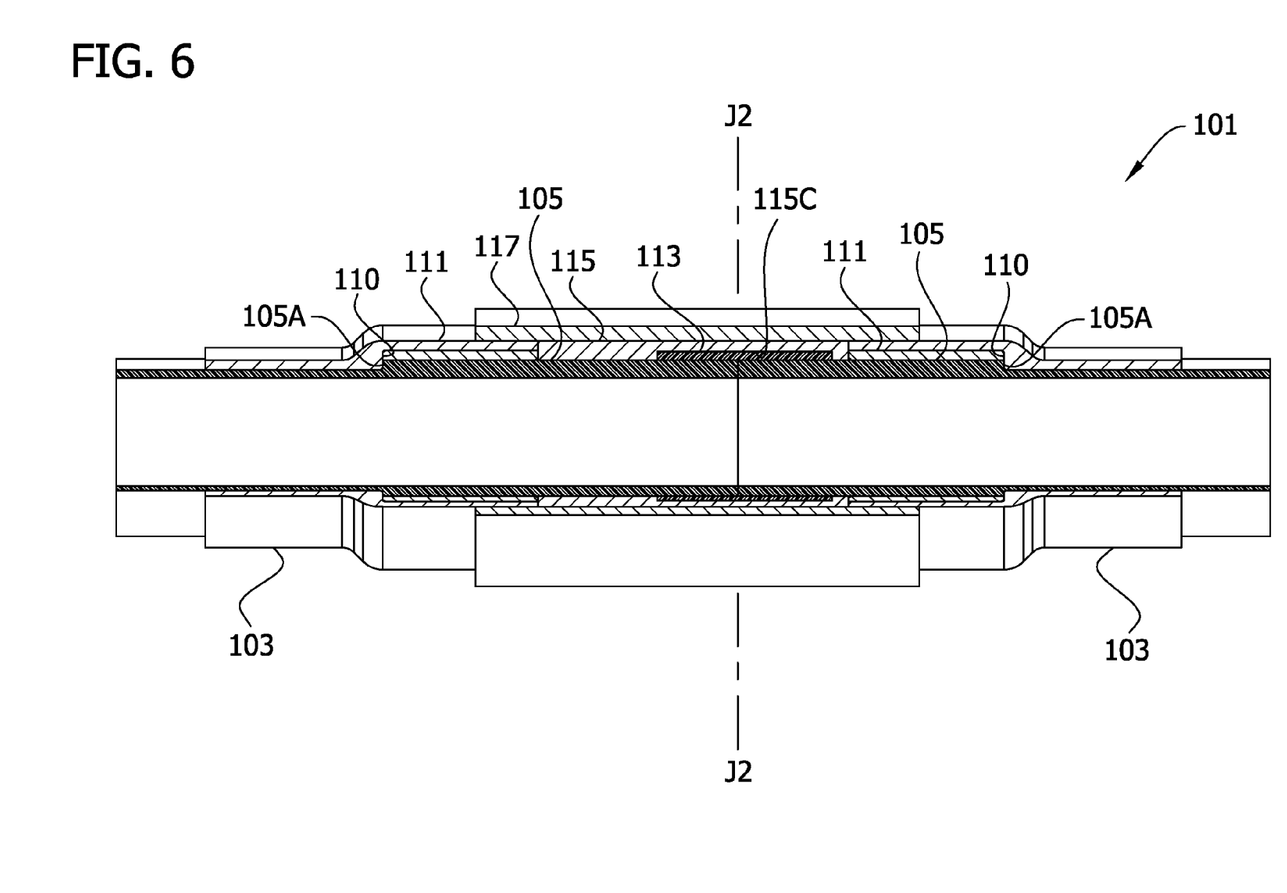
FIG. 6 is the assembled lined pipe connection of FIG. 5 having a quarter section removed.

FIGS. 5 and 6 illustrate a connection of a second embodiment, which is generally designated by the reference number 101. The connection 101 includes two sides which each have three parts. More specifically, each side includes a hub 103, a stubend 105, and a thermal insulating member 111. The connection 101 also includes an electrofusion coupling 113, a bushing 115, and a collar 117, each of which span the two sides of the connection 101, as described in further detail below. The foregoing elements can form part of a connection kit.

An end of each hub 103 is joined (e.g., welded) to a respective end of a pipe to be connected. The hubs 103 of this embodiment are substantially similar to the hubs 3 described above. For example, the hubs 103 include internal structure for positioning the stubends 105 with respect to the hubs. In the illustrated embodiment, the internal structure is an internal circumferential shoulder 110. As described in further detail below, the shoulders 110 engage the stubends 105 for limiting movement of the stubends away from a joint line of the connection J2 (FIG. 6) between the sides of the connection 110. The hubs 103 are oriented so the shoulders 110 face the joint line of the connection J2, or the hub 103 on the other side of the connection 101. The hubs 103 may be formed of suitable materials, such as steel. Hubs 103 having configurations other than illustrated may be used without departing from the scope of the present invention.

The stubends 105 may be referred to broadly as "liner sections." The stubends 105 may be formed of the same material as the liners, such as a heat fusible thermoplastic material. The stubends 105 may be part of the liners, or may be formed separately from the liners and thereafter connected to the liners. In the illustrated embodiment, the stubends 105 are formed separately from the liners. After the hubs 103 are connected to the pipes, the stubends 105 are connected to ends of the liners of respective pipes. The stubends 105 of this embodiment are similar to the stubends 5 described above. For example, each stubend 105 includes external structure for locating the stubend with respect to a hub 103. In the illustrated embodiment, the external structure is a flange or step 105A corresponding to the internal shoulder 110 of the hub 3. To connect a stubend 105 to a liner, an end of the liner is stretched out from inside the pipe or hub 103 to a position outside the pipe or hub where the end of the liner is accessible. An end of the stubend 105 is then fused to the end of the liner. After fusing the stubend 105 to the liner, the end of the liner is permitted to retract back into the pipe. Desirably, the end of the liner retracts back into the pipe until the external flange 105A of the stubend 105 engages the internal shoulder 110 of the hub 103. The external flange 105A of each stubend 105 faces the shoulder 110 of a respective hub 103. The shoulders 110 of the hubs 103 act as "stops" for positioning the stubends 105 with respect to the hubs. This process of connecting the stubend 105 to the liner is carried out on both sides of the connection 101. The stubend 105 shown on the left side of the connection 101 is longer than the stubend 105 on the right side of the connection for reasons which will become apparent. The stubends 105 may have the same length without departing from the scope of the present invention. Stubends 105 having configurations other than illustrated may be used without departing from the scope of the present invention. For example, the stubends 105 may not include an external flange 105A or other structure that engages internal structure of the hubs 103 to prevent movement of stubends away from each other. Moreover, the stubends 105 may be omitted without departing from the scope of the present invention. For example, the ends of the liners themselves ("liner sections") may be used to form the connection of the liners as described herein with respect to the stubends 105.

The insulating members 111 are generally cylindrical and may be made of ceramic material or other suitable material. The insulating members 111 may be installed on the liner before installing the stubends. Alternatively, the insulating members 111 may be installed after the stubends 105 by sliding the insulating members over the stubends. When installed, the insulating members 111 are in a position in which ends of the insulating members engage the internal shoulders 110 of the hubs 103 and the opposite ends of the insulating members 111 are about flush with the free ends of the hubs 103. The insulating members 111 are positioned to protect the stubends 105 from heat generated by welding performed in a later installation step, as described below. It is to be understood that the insulating members 111 may be omitted without departing from the scope of the present invention. For example, the stubends 105 may not need to be protected from the heat generated during the welding step because it may not be hot enough to adversely affect the stubends.

The electrofusion coupling 113 is tubular and used for welding or fusing the ends of the stubends 105 together. The electrofusion coupling 113 is installed by first sliding it over the longer stubend 105. The electrofusion coupling 113 is moved along the stubend 105 to a position in which it is spaced from the joint line J2. Using a jig (not shown), the stubends 105 are aligned so the free ends of the stubends are in register with each other, or concentric and flush. End portions of the stubends 105 are measured, scraped, and cleaned to prepare them for electrofusion. The electrofusion coupling 113 is then slid into a position where it overlaps the abutting end portions of the stubends 105 and spans the joint line J2. The electrofusion coupling 113 is then fused to the stubends 105 and the stubends are fused to each other, forming a fluid tight seal between the stubends at the joint line J2. The fused ends of the stubends 105 and the electrofusion coupling 113 may define joint structure in this embodiment.

The bushing 115 includes a plurality of circumferential segment bushing parts. In the illustrated embodiment, the bushing 115 is a "split" or "clamshell" bushing including two circumferential segment bushing parts 115A, 115B. It will be understood that the bushing may be made of more than two parts without departing from the scope of the present invention. The bushing 115 is installed by positioning the parts 115A, 155B on opposite sides of the fused ends of the stubends 105 to form a tube around the fused stubends which extends on both sides of the joint line J2. The bushing 115 has an internal surface which engages and closely conforms to the outer surfaces of the stubends 105 and includes an internal annular recess 115C sized to receive the electrofusion coupling 113. The internal annular recess engages and closely conforms to the electrofusion coupling 113. The internal annular recess 115C corresponds to the size and shape of the electrofusion coupling 113 for accommodating for the thickness of the electrofusion coupling. When installed, the bushing 115 is in generally flush engagement with the outer circumference of the electrofusion coupling 113 and, away from the coupling, in generally flush engagement with the outer surfaces of the end portions of the stubends 105. Desirably, the bushing 115 has a length so that the bushing extends between the free ends of the hubs 103 to fill the gap between the free ends of the hubs 103. The bushing 115 may be made of steel, or other suitable materials.

The collar 117 is tubular and is moved into position after the bushing 115 is installed. In this embodiment, a "collar assembly" is formed by a single, tubular piece (i.e., the collar 117). Desirably, the collar 117 has already been slid over the one of the hubs 103 (before the stubends are fused together) to a position in which the collar 117 can readily be slid over the bushing 115 after the bushing is installed. The collar 117 is moved to a position where it extends on both sides of the joint line J2. In this position, the ends of the collar 117 desirably overlie the insulating members 111. The ends of the collar 117 are welded to the outer surfaces of the hubs 103, forming a rigid connection with the hubs. The insulating members 111 protect the stubends 105 from heat generated during welding. The collar 117 may be made of various suitable materials, such as steel. In the illustrated embodiment, the location of the joint J2 between the stubends 105 is offset from the location of the connection of the stubends 105 to the liner already in the pipe. The location of the junction J2 between the stubends 105 is also offset from the locations where the hubs 103 are welded to the pipes and where the collar 117 is welded to the hubs 103. The completed connection 101 provides a leak-proof, inert fluid path. The inside diameters of the stubends 105 provide the connection with a generally constant inside diameter which corresponds to the inside diameter of the liners connected. Thus, the diameter of the flow path from liner to liner across the connection 101 is generally constant. In embodiments in which the stubends 105 are made of thermoplastic material, the connection 101 provides thermoplastic material (e.g., HDPE) along substantially the entire length of the connection. In other words, thermoplastic material is provided along substantially the entire distance between the connected ends of the liners. This construction is beneficial because it provides a flow path along the connection that is bounded substantially continuously by abrasion-resistant thermoplastic material. Moreover, in the connection 101, the fusing of the stubends 105 to each other using the electrofusion coupling 113 provides a fused joint of the stubends at which thermoplastic material extends continuously between the stubends. This is in comparison to unfused joints at which there is a break in the thermoplastic material, such as where bolt force may be used to hold abutting ends of liner sections together.

The construction of the connection 101 provides enhanced axial and radial strength at the connection. More specifically, the collar 117 provides radial and axial support to the connection 101. Outward radial force is transmitted from the fused stubends 105 and electrofusion coupling 113 to the collar 117 through the bushing 115. Because the bushing 115 closely conforms to the stubends 105 and the electrofusion coupling 113, radial forces around substantially the entire circumference of the stubends and electrofusion coupling are transmitted to the collar 117. The collar 117 resists outward radial movement of the electrofusion coupling 113 as well as the stubends 105 adjacent the fused joint. The bushing 115 also provides axial support to the connection 101 because the ends of the bushing engage the ends of the hubs, which are joined to the pipes. Accordingly, the fused stubends 105 are reinforced axially and radially so the connection 101 can withstand significant forces such as radial force resulting from pressurized fluid flowing along the pipeline. In addition, the connection 101, and in particular the fused joint of the stubends 105 and the electrofusion coupling 113 are isolated from tension forces on the liners because of the engagement of the external flanges 105A on the stubends 105 with the internal shoulders 110 on the hubs 103.

Figure 7:
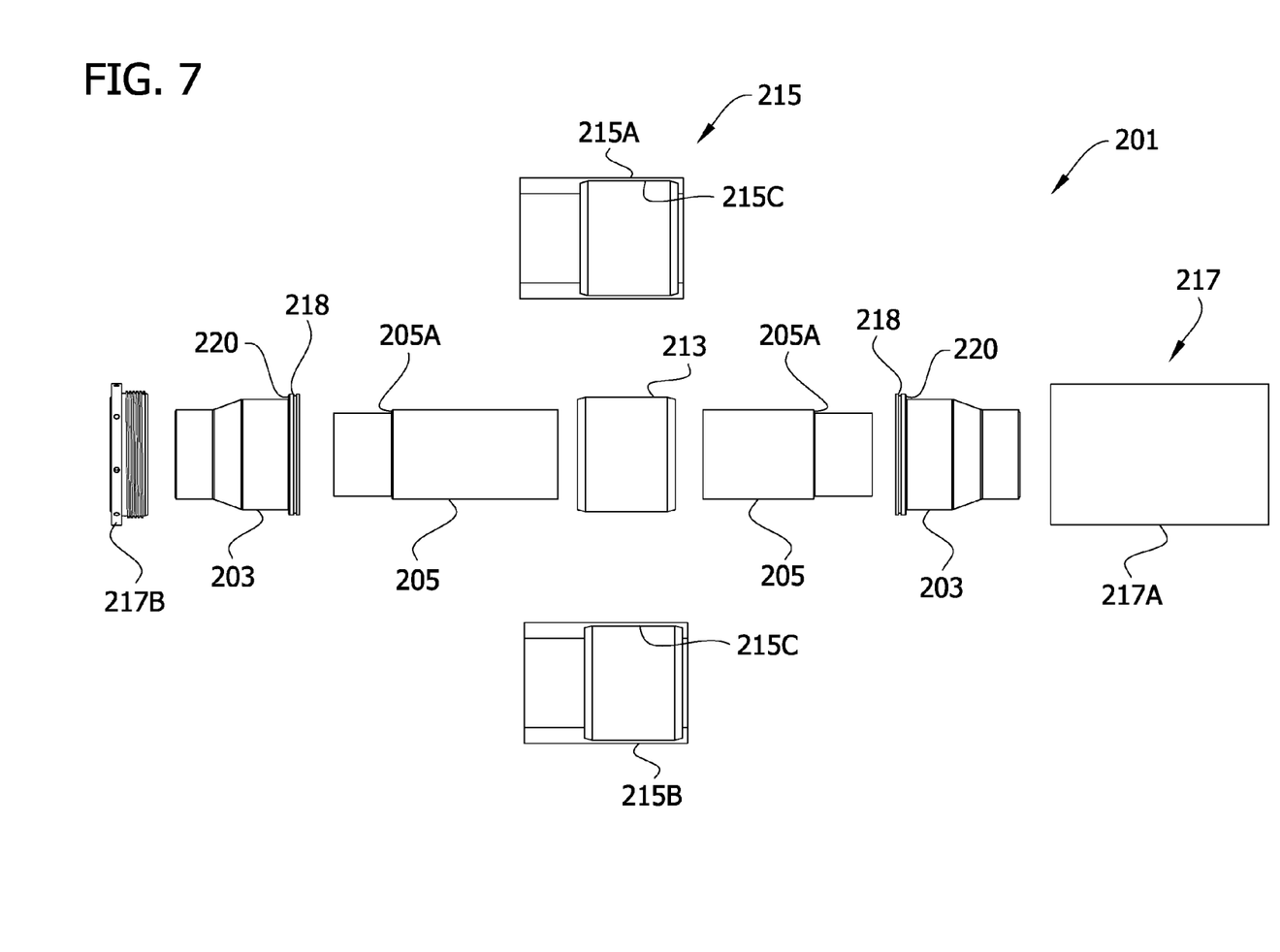
FIG. 7 is an exploded side elevation of a third embodiment of a lined pipe connection kit showing clamshell bushing parts turned toward the viewer to show internal construction
Figure 8:
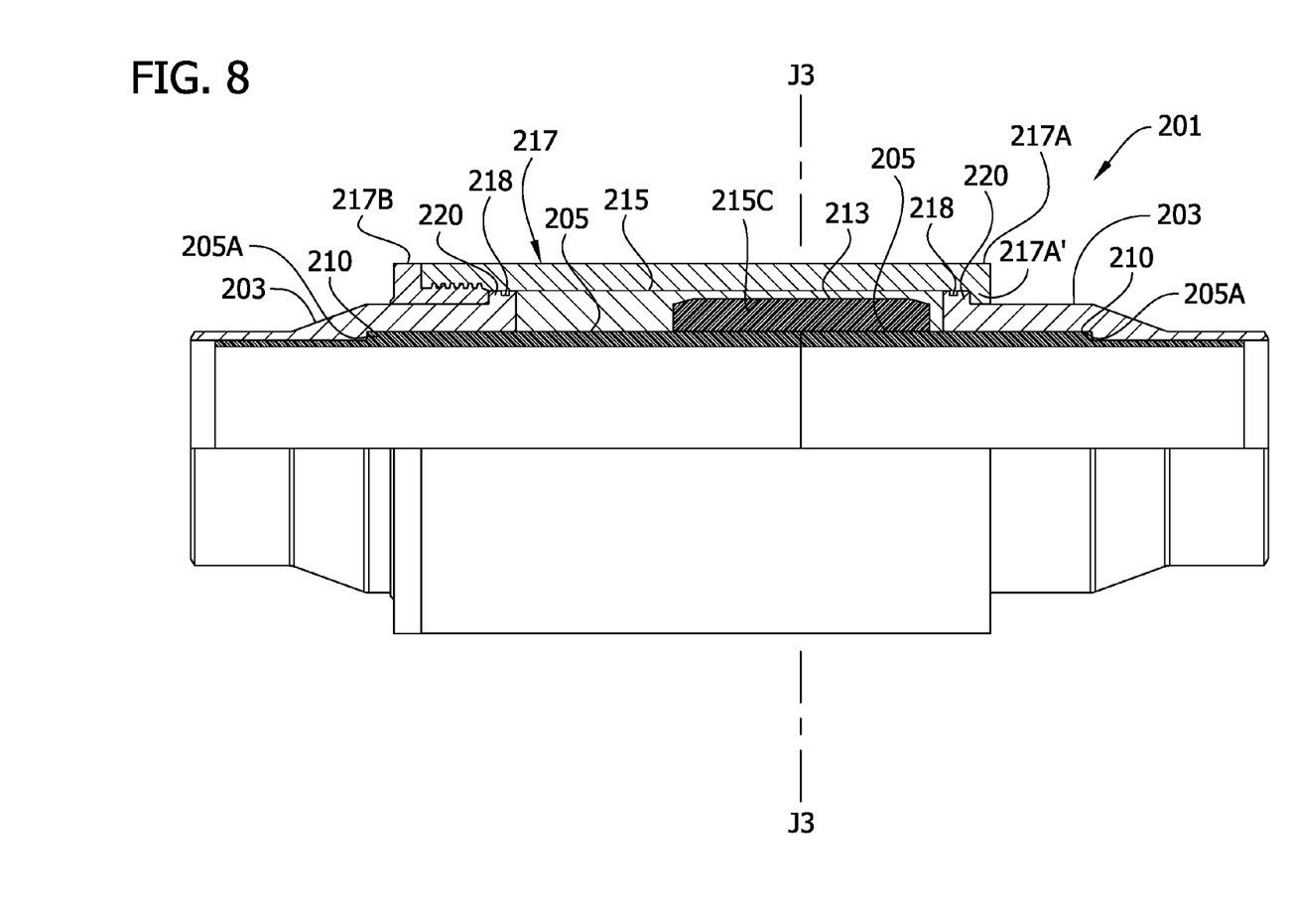
FIG. 8 is the assembled lined pipe connection of FIG. 7 having a quarter section removed.

FIGS. 7 and 8 illustrate a connection of a third embodiment, which is generally designated by the reference number 201. The connection 201 includes two sides which each have two parts. More specifically, each side includes a hub 203 and a stubend 205. The connection 201 also includes an electrofusion coupling 213, a bushing 215, and a collar assembly 217, which span the two sides of the connection, as described in further detail below.

An end of each hub 203 is joined (e.g., welded) to a respective end of a pipe to be connected. The hubs 203 of this embodiment are substantially similar to the hubs 103 described above. For example, the hubs 203 include internal structure for positioning the stubends 205 with respect to the hubs. In the illustrated embodiment, the internal structure is an internal circumferential shoulder 210. As described in further detail below, the shoulders 210 engage the stubends 205 for limiting movement of the stubends away from a joint line J3 (FIG. 8) of the connection 201 between the sides of the connection. The hubs 203 are oriented so the shoulders 210 face the joint line J3, or the hub on the other side of the connection 201. In this embodiment, the hubs 203 include 0-rings 218 received in grooves on the radially outward facing surfaces of flanges 220 at the free ends of the hubs. The O-rings 218 are provided for enhancing a seal against the collar assembly 217, as will be described in further detail below. The hubs 203 may be formed of various suitable materials, such as steel. Hubs 203 having configurations other than illustrated may be used without departing from the scope of the present invention.

As with the stubends 105 described above, the stubends 205 may be referred to broadly as "liner sections." The stubends 205 may be formed of the same material as the liners, such as a heat fusible thermoplastic material. The stubends 205 may be part of the liners, or may be formed separately from the liners and thereafter connected to the liners. In the illustrated embodiment, the stubends 205 are formed separately from the liners. After the hubs 203 are connected to the pipes, the stubends 205 are connected to ends of the liners of respective pipes. The stubends 205 of this embodiment are similar to the stubends 105 described above. For example, each stubend 205 includes external structure for locating the stubend with respect to a hub 203. In the illustrated embodiment, the external structure is a flange or step 205A corresponding to the internal shoulder 210 of the hub 203. To connect a stubend 205 to a liner, an end of the liner is stretched out from inside the pipe or hub 203 to a position outside the hub where the end of the liner is accessible. An end of the stubend 205 is then fused to the end of the liner. After fusing the stubend 205 to the liner, the end of the liner is permitted to retract back into the pipe. Desirably, the end of the liner retracts back into the pipe until the external flange 205A of the stubend engages the internal shoulder 210 of the hub 203. The external flange 205A of each stubend faces the shoulder 210 of a respective hub. The shoulders 210 of the hubs 203 act as "stops" for positioning the stubends 205 with respect to the hubs. This process of connecting the stubend 205 to the liner is carried out on both sides of the connection 201. The stubend 205 shown on the left side of the connection 201 is longer than the stubend 205 on the right side of the connection for reasons which will become apparent. However, the stubends 205 may have the same length without departing from the scope of the present invention. Stubends 205 having configurations other than illustrated may be used without departing from the scope of the present invention. For example, the stubends 205 may not include an external flange 205A or other structure that engages internal structure of the hubs 203 to prevent movement of the stubends away from each other. Moreover, the stubends 205 may be omitted without departing from the scope of the present invention. For example, the ends of the liners themselves ("liner sections") may be used to form the connection of the liners as described herein with respect to the stubends 205.

The electrofusion coupling 213 may be substantially similar to the electrofusion coupling 113 of the second embodiment. The electrofusion coupling 213 is installed by sliding it over the longer stubend 205. The electrofusion coupling 213 is moved along the stubend 205 to a position in which the electrofusion coupling is spaced from the joint line J3. Using a jig (not shown), the stubends 205 are aligned so the free ends of the stubends are in register with each other, or concentric and flush. End portions of the stubends 205 are measured, scraped, and cleaned to prepare them for electrofusion. The electrofusion coupling 213 is then slid to a position where it overlaps the end portions of the stubends 205 and spans the joint line J3. The electrofusion coupling 213 is then fused to the stubends 205, forming a fluid tight seal between the stubends 205 at the joint line J3.

The bushing 215 is substantially the same as the bushing 115 of the second embodiment. The bushing includes circumferential segment bushing parts 215A, 215B and is installed by positioning the parts on opposite sides of the fused ends of the stubends. The bushing also has an internal annular recess 215C which receives the electrofusion coupling 213. Other aspects of the bushing 215 are consistent with the bushing 115 described above.

The collar assembly 217 includes first and second tubular members 217A, 217B which are moved into position after the bushing 215 is installed. The tubular member 217A has an internal thread, and the tubular member 217B has an external thread. The tubular members 217A, 217B may be made of suitable material, such as steel. Desirably, the tubular members 217A, 217B have already been slid over respective hubs 203 (before the stubends 205 are fused together) into a position in which they can be readily slid into position over the bushing 215 after it has been installed. The tubular members 217A, 217B are slid toward each other to a position in which the external thread of the tubular member 217B ages the internal thread of the tubular member 217A. At least one of the tubular members 217A, 217B is rotated with respect to the other to draw the tubular members toward each other. The tubular members 217A, 217B may be tack welded to each other for preventing the threaded connection from loosening. The 0-rings 218 and the flanges 220 of the hubs 203 desirably form a (secondary) seal between an inner surface of the collar 217 and the free ends of the hubs. It will be understood that the 0-rings 218 may be omitted within the scope of the present invention. In the illustrated embodiment, the location of the joint J3 between the stubends 205 is offset from the location of the connection of the stubends 205 to the liner already in the pipe. The location of the junction J2 between the stubends 205 is also offset from the locations where the hubs 203 are welded to the pipes and where the collar 217 is welded to the hubs 203.

The collar assembly 217 desirably includes structure which engages the hubs 203 for providing axial support to the connection 201. For example, in the illustrated embodiment, the threaded connection of the tubular members 217A, 217B causes the tubular members to be securely clamped onto the hubs 203 by interference fit. The tubular members are adapted to engage external flanges 220 on the hubs 203. An end of the tubular member 217B engages the flange 220 on the free end of the respective hub 203. An internal circumferential flange 217A' of the tubular member 217A opposite the end having the internal thread engages the flange 220 on the free end of the respective hub 203. Thus, the threaded connection of the tubular members 217A, 217B urges the hubs 203 toward each other to provide axial support against force tending to pull the connection apart. In addition, the tubular members 217A, 217B may be welded to the respective hubs 203 to provide axial support against forces tending to compress the connection 201 at the joint J3.

If desired, a tertiary seal may be provided. More specifically, circumferential seal welds may be formed between the tubular members 217A, 217B of the collar 217 and between the tubular members 217A, 217B and respective hubs 203. Suitable insulating members may be provided as part of the connection if necessary to protect the stubends from heat generated during the welding.

The completed connection 201 provides a leak-proof, inert fluid path. The inside diameters of the stubends 205 provide the connection 201 with a generally constant inside diameter which corresponds to the inside diameter of the liners connected. Thus, the diameter of the flow path from liner to liner across the connection 201 is generally constant. In embodiments in which the stubends 205 are made of thermoplastic material, the connection 201 provides thermoplastic material (e.g., HDPE) along substantially the entire length of the connection. In other words, thermoplastic material is provided along substantially the entire distance between the connected ends of the liners. The fusing of the stubends 205 to each other using the electrofusion coupling 213 provides a fused joint (joint structure) of the stubends at which thermoplastic material extends continuously between the stubends. This construction is beneficial because it provides a flow path along the connection 201 bounded substantially continuously by abrasion-resistant thermoplastic material. The construction of the connection 201 provides enhanced axial and radial strength at the connection. More specifically, the collar 217 provides radial and axial support to the connection 201. Outward radial force is transmitted from the fused stubends 205 and electrofusion coupling 213 to the collar 217 through the bushing 215. The collar 217 resists outward radial movement of the stubends 205 and electrofusion coupling 213. As explained above, the collar 217 provides axial support to the connection 201 via engagement with the external flanges 220 on the hubs 203. The bushing 215 also provides axial support to the connection 201 because the ends of the bushing engage the ends of the hubs 203, which are joined to the pipes. Accordingly, the fused stubends 205 are reinforced axially and radially so the connection 201 can withstand significant forces such as radial force resulting from pressurized fluid flowing along the pipeline. In addition, the connection 201, and in particular the joint of the stubends 205 and the electrofusion coupling 213 are isolated from tension forces on the liners because of the engagement of the external flanges 205A on the stubends 205 with the internal shoulders 210 on the hubs 203.

Figure 9:
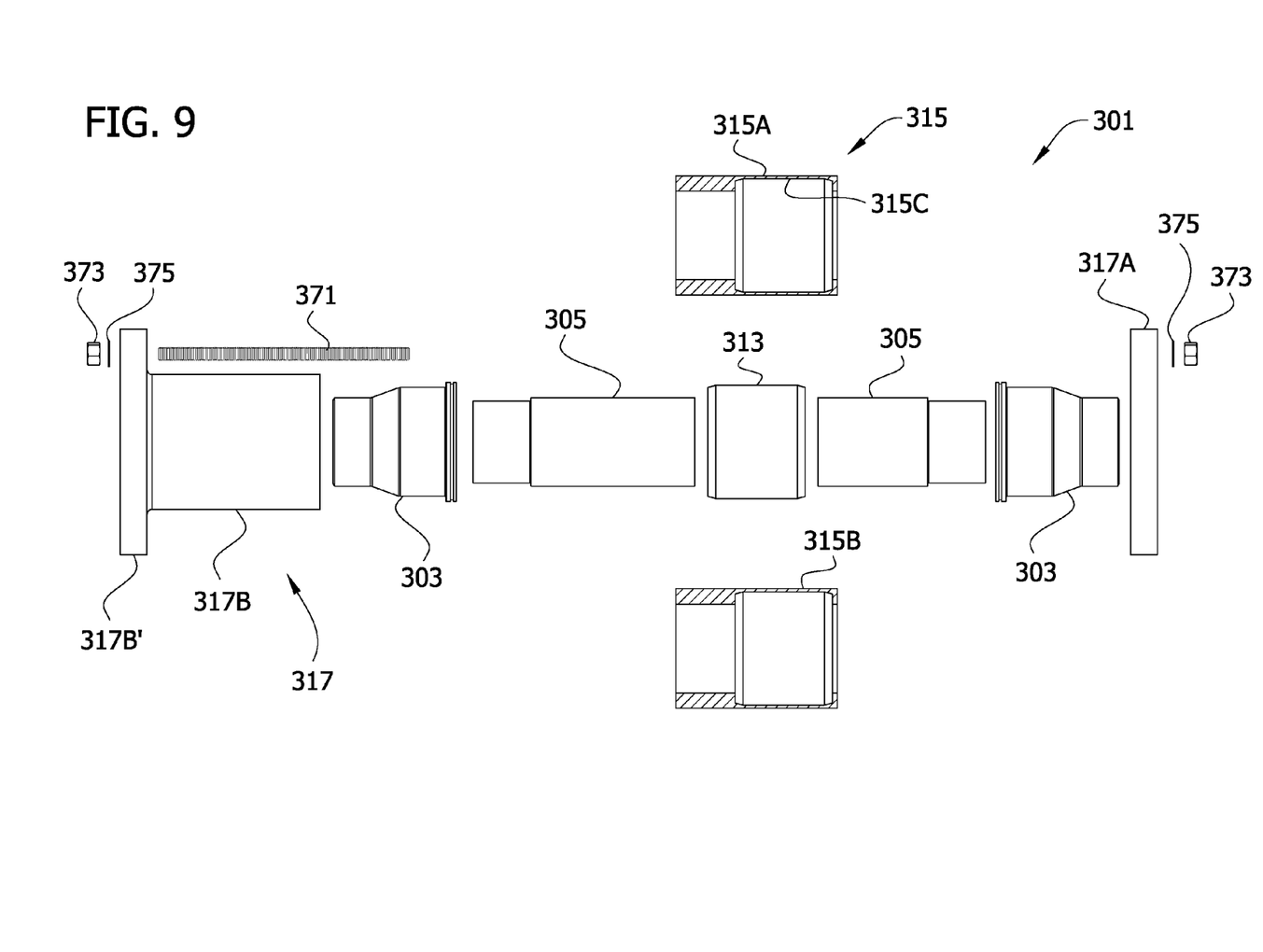
FIG. 9 is a an exploded side elevation of a fourth embodiment of a lined pipe connection kit showing clamshell bushing parts turned toward the viewer to show internal construction.
Figure 10:
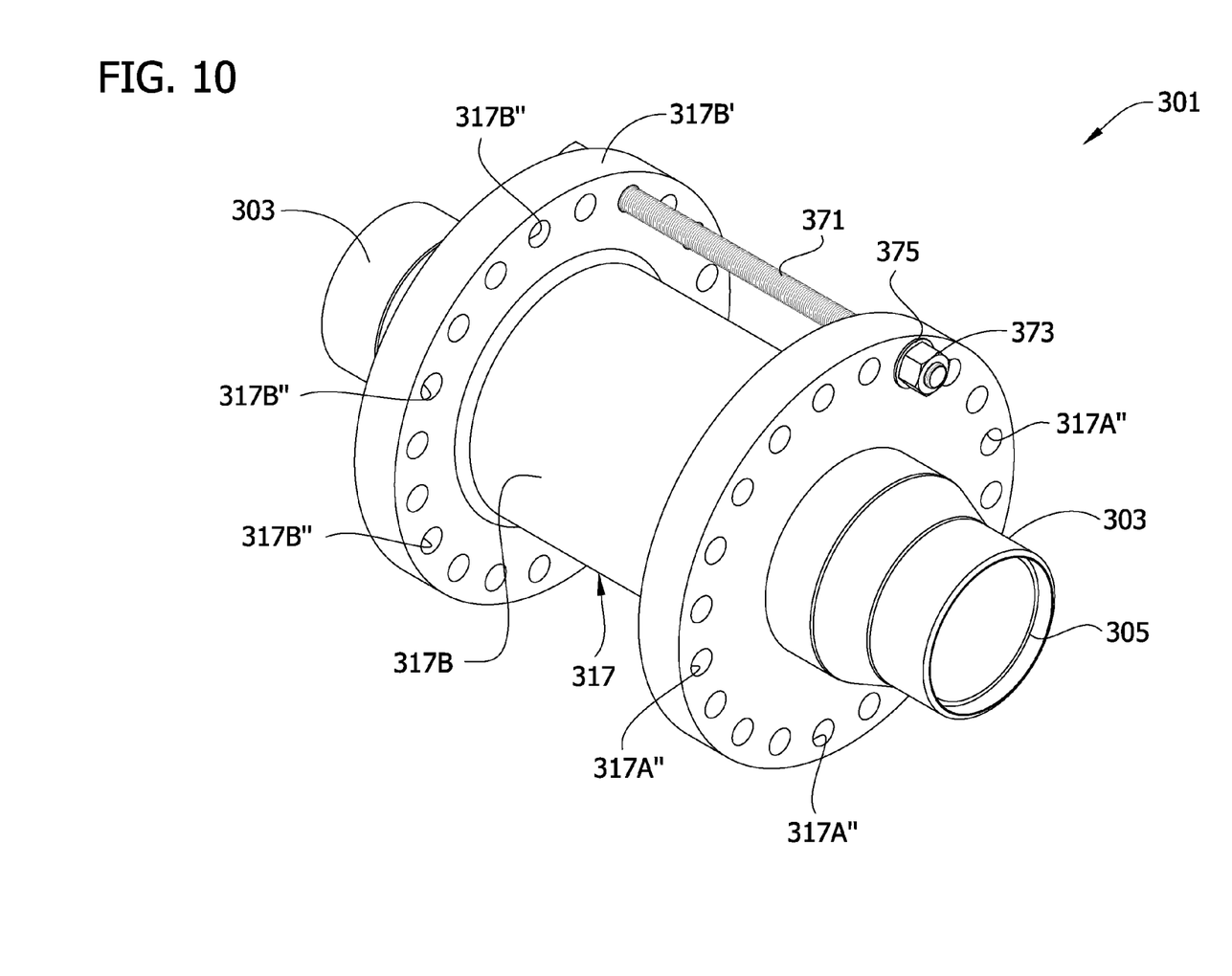
FIG. 10 is a perspective of the lined pipe connection of FIG. 9.
Figure 11:
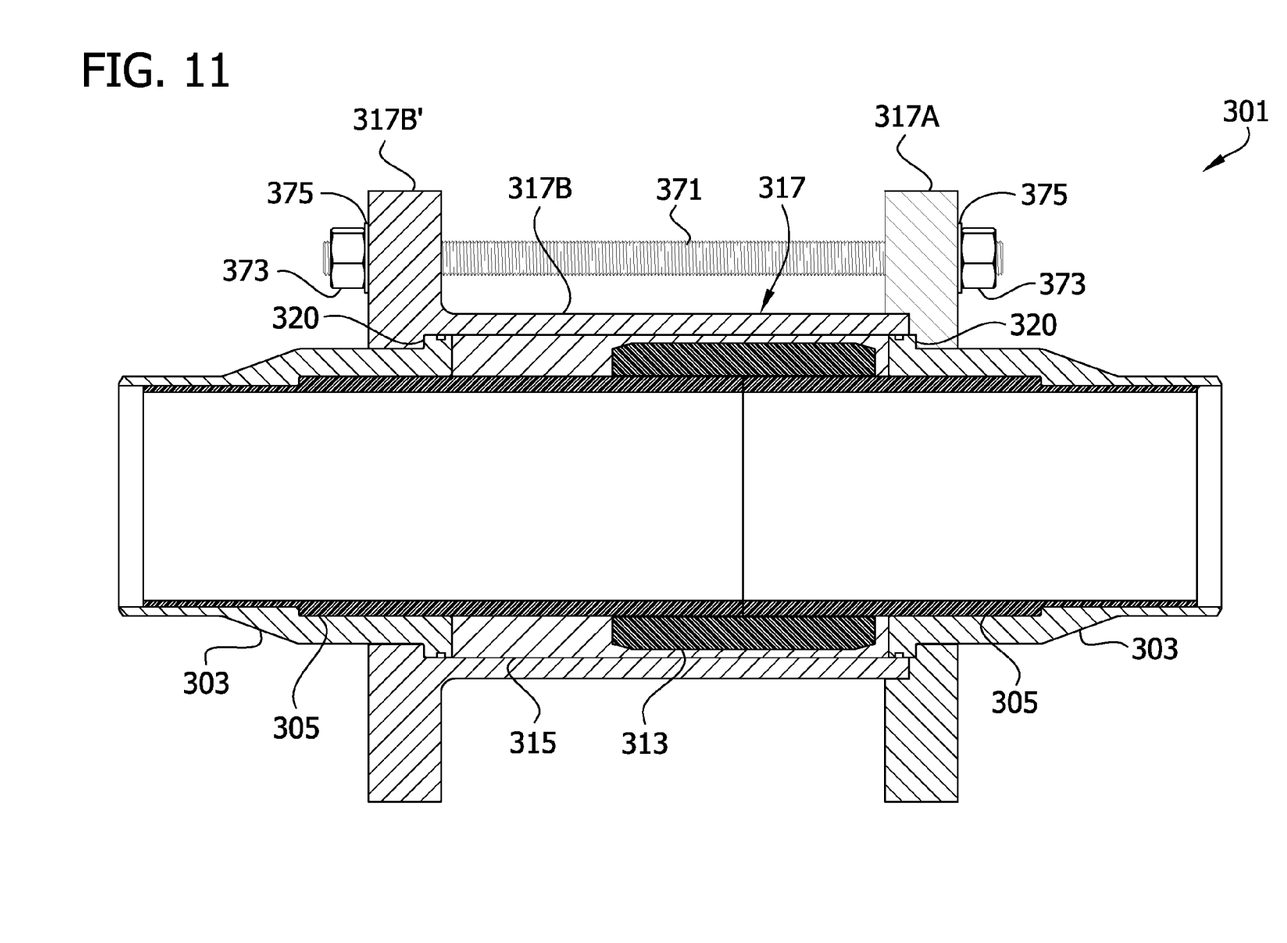
FIG. 11 is a section of the lined pipe connection of FIG. 9.

FIGS. 9-11 illustrate a connection of a fourth embodiment, which is generally designated by the reference number 301. The connection 301 is similar to the connection 201 described above. For example, the connection 301 includes hubs 303, stubends 305, an electrofusion coupling 313, a bushing 315, and a collar assembly 317. It will be understood that the hubs 303, stubends 305, electrofusion coupling 313, and bushing 315 may be substantially the same as described above with respect to corresponding components of the connection 201. The collar assembly 317 is also similar to the collar assembly 217 except that instead of a threaded connection, a bolted connection is used. The tubular member 317B includes an external flange 317B' including a plurality of openings 317B". The tubular member 317A includes a corresponding plurality of openings 317A". A plurality of bolts 371 may be installed (only one bolt 371 being illustrated) through the openings 317A", 317B"s 373 and optional washers 375 may be installed on free ends of the bolts 371. Tightening of the nuts 373 on the bolts 371 draws the tubular members 317A, 317B toward each other, which clamps the collar assembly 317 onto the hubs 303. More specifically, the tubular members 317A, 317B engage the flanges 320 on the hubs 303. Thus, the bolted connection of the tubular members 317A, 317B urges the hubs 303 toward each other to provide axial support against force tending to pull the connection 301 apart. The connection 301 also provides many other benefits as described above with respect to the other embodiments.

As with the stubends 105, 205 described above, the stubends 305 may be referred to broadly as "liner sections." The stubends 305 may be formed of the same material as the liners, such as a heat fusible thermoplastic material. The stubends 305 may be part of the liners, or may be formed separately from the liners and thereafter connected to the liners, as described with respect to stubends 105, 205.

As is now apparent, the connections and methods of the present invention provide various advantages. For example, the construction of the connections provides them with a fluid-tight seal and significant strength. The engagement of the stubends with the hubs isolates the connection from tension forces of the liners. As illustrated by the second, third, and fourth embodiments, the present invention permits electrofusion for pipe lined with heat fusible thermoplastic material. Electrofusion of heat fusible thermoplastic material forms a desirable fluid-tight seal, but the electrofusion by itself does not form a particularly robust connection. The connections provide axial and radial support for the fused thermoplastic stubends. The combination of the electrofusion of thermoplastic stubends and external components of the connections provides a connection having a desirable fluid-tight seal and sufficient strength for high-force applications. The highest pressure rating of an electrofusion coupling by itself is about 350 psi. Connections constructed according to the present invention, including the connections of the first, second, and third embodiments, can have a pressure rating of greater than 350 psi, 500 psi, 1,000 psi, or even 2,000 psi. In, and in another embodiment the connection can have a pressure rating of at least 5,000 psi, and still in another embodiment may have a pressure rating of at least about 9,300 psi.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A connection of two pipes each including a liner, the connection comprising:
   liner sections connected to the liners, the liner sections being tubular and being formed of fusible material, the liner sections being fused together forming a fused joint of the liner sections, fusible material extending between the liner sections at the fused joint;
   an electrofusion coupling overlying the liner sections and fused to the liner sections forming the fused joint of the liner sections;
   a collar assembly overlying the electrofusion coupling, the collar assembly being positioned so that an inner surface of the collar assembly radially opposes the electrofusion coupling and provides radial backing to the electrofusion coupling for radially reinforcing the electrofusion coupling; and
   a bushing between the electrofusion coupling and the collar assembly, wherein the bushing has an inner surface which engages and conforms to outer surfaces of the liner sections, the bushing having an internal annular recess sized to receive the electrofusion coupling and which engages and conforms to an outer surface of the electrofusion coupling.

2. A connection as set forth in claim 1 wherein the inner surface of the collar assembly engages and conforms to an outer surface of the bushing, whereby the collar assembly and bushing resist radial expansion of the electrofusion coupling.

3. A connection as set forth in claim 1 wherein the bushing has a tubular body including a plurality of separate circumferential segment bushing parts.

4. A connection as set forth in claim 1 further including two hubs positioned on opposite sides of the fused joint of liner sections, the liner sections being received in respective hubs and extending toward each other out of the hubs, the hubs having ends facing toward each other and spaced from each other to form a gap between the hubs, the electrofusion coupling and bushing being positioned in the gap.

5. A connection as set forth in claim 4 wherein the collar assembly spans the gap between the hubs and is connected to each of the hubs.

6. A connection as set forth in claim 5 wherein the collar assembly is welded to each hub.

7. A connection as set forth in claim 5 wherein the collar assembly includes first and second tubular members having corresponding threads formed for threaded engagement with each other, the threaded engagement urging the tubular members toward each other into engagement with respective hubs.

8. A connection as set forth in claim 5 wherein the collar assembly includes first and second tubular members, the tubular members being bolted to each other to urge the tubular members toward each other into engagement with respective hubs.

9. A connection as set forth in claim 4 wherein the liner sections are stubends and the fused joint of the liner sections is a fused joint of the stubends, the stubends including external structure and the hubs include internal structure, the external structure of the stubends engaging the internal structure of the hubs to resist movement of the stubends away from the fused joint of the stubends to isolate the fused joint of the stubends from tension forces applied to the stubends.

10. A connection as set forth in claim 1 having a pressure rating of greater than 350 psi.

11. A connection of two pipes each including a liner, the connection comprising:
hubs joined to the pipes and operatively connected to each other;
liner sections extending inside the hubs and fused to each other at a joint structure to form a flow path from one liner section to the other; and
the liner sections including external structure and the hubs including internal structure, the external structure of the liner sections engaging the internal structure of the hubs to resist movement of the liner sections away from each other;
wherein the liner sections include abutting ends which are joined to each other defining the joint structure, the external structure of the liner sections engaging the internal structure of the hubs to resist movement of the liner sections away from the joint of the liner sections;
wherein the liner sections are stubends, the hubs each having an internal shoulder having a radially inwardly facing surface and an axially inwardly facing surface facing the joint structure of the stubends, the stubends each having an external flange having a radially outwardly facing surface and an axially outwardly facing surface facing away from the joint structure of the stubends, the internal shoulders of the hubs engaging the external flanges of the stubends such that the radially inwardly and outwardly facing surfaces engage one another and the axially inwardly and outwardly facing surfaces engage one another to prevent movement of the stubends away from the joint structure of the stubends to isolate the joint structure from tension forces applied to the stubends, at least one of the stubends extending outwardly from the collar toward to abutting engagement with the other stubend.

12. A connection as set forth in claim 11 further comprising a collar assembly overlying the hubs and spanning the joint structure, the collar assembly being connected to each of the hubs.

13. A connection as set forth in claim 11 further including an electrofusion coupling and wherein the joint structure of the liner sections comprises fused material of the joined liner sections, the electrofusion coupling overlying the joint structure.

14. A method of forming a connection of two pipes each including a liner, the method comprising:
connecting liner sections to the ends of the liners;
positioning an electrofusion coupling over one of the liner sections;
positioning a tubular collar assembly over an end of one of the liner sections;
positioning ends of the liner sections in register with each other to form a joint of the liner sections;
moving the electrofusion coupling over the joint of the liner sections and fusing the joint of the liner sections using the electrofusion coupling; and
moving the collar assembly over the electrofusion coupling to provide the electrofusion coupling with radial backing.

15. A method as set forth in claim 14 further comprising positioning a bushing over the electrofusion coupling before moving the collar assembly over the electrofusion coupling so that, after moving the collar assembly over the fused joint, the bushing is positioned between the electrofusion coupling and the collar assembly.

16. A method as set forth in claim 15 wherein the bushing includes an internal surface and an internal annular recess and positioning the bushing over the electrofusion coupling comprises engaging the internal surface of the bushing with outer surfaces of the liner sections and engaging the internal annular recess with the electrofusion coupling.

17. A kit for joining pipes together where the pipes each have a liner, to form a joint of the pipes that is continuously lined through the joint, the kit comprising:
a collar assembly including a tubular member adapted for being rigidly connected to ends of both of the pipes;
a bushing separate from the collar assembly having a tubular shape, an exterior surface configured for conforming engagement with an interior surface of the tubular member, and an interior surface having a circumferentially extending recess sized and shaped for conformally receiving a separate electrofusion coupling for transmitting radial forces from the electrofusion coupling to the bushing, further comprising liner sections adapted to be joined together by fusing the liner sections having external strain relief structure, and hubs adapted for rigid connection to the pipes, the hubs each having internal strain relief structure engageable with the external strain relief structure on the liner sections to transfer tension loads from the liner sections to the hubs.

* * * * *